(12) United States Patent
Vainonen et al.

(10) Patent No.: US 8,203,291 B2
(45) Date of Patent: Jun. 19, 2012

(54) GENERATOR ASSEMBLY

(75) Inventors: Pekka Vainonen, Hyvinkää (FI); Mikko Porma, Vantaa (FI); Juha Santala, Kerava (FI)

(73) Assignee: Konecranes PLC, Hyvinkaa (FI)

( * ) Notice: Subject to any disclaimer, the term of this patent is extended or adjusted under 35 U.S.C. 154(b) by 314 days.

(21) Appl. No.: 12/527,077

(22) PCT Filed: Feb. 12, 2008

(86) PCT No.: PCT/FI2008/050053
§ 371 (c)(1),
(2), (4) Date: Aug. 13, 2009

(87) PCT Pub. No.: WO2008/099055
PCT Pub. Date: Aug. 21, 2008

(65) Prior Publication Data
US 2010/0097016 A1    Apr. 22, 2010

(30) Foreign Application Priority Data
Feb. 14, 2007    (FI) ..................................... 20075102

(51) Int. Cl.
*H02P 25/30*    (2006.01)
*H02P 7/00*    (2006.01)
(52) U.S. Cl. ......... 318/152; 318/151; 318/140; 318/157
(58) Field of Classification Search .................. 318/152, 318/151, 140, 157, 158
See application file for complete search history.

(56) References Cited

U.S. PATENT DOCUMENTS

| 4,695,736 | A | | 9/1987 | Doman et al. |
| 5,225,712 | A | * | 7/1993 | Erdman ........................ 290/44 |
| 2005/0012339 | A1 | | 1/2005 | Mikhail et al. |

FOREIGN PATENT DOCUMENTS
WO    WO-93/11604 A1    6/1993

OTHER PUBLICATIONS

ABB " Teknisiä Tietoja ja Taulukoita", 8, painos, Vaasa Oy, Vaasa, 1992, sivut, pp. 408-409.
Matsch, Leander and Morgan, Derald. Electromagnetic and Electromechanical Machines. John Wiley & Sons, 1987, vol. 3, ISBN 0-471-61305-3, pp. 206-207.

* cited by examiner

*Primary Examiner* — Walter Benson
*Assistant Examiner* — Erick Glass
(74) *Attorney, Agent, or Firm* — Birch, Stewart, Kolasch & Birch, LLP

(57) ABSTRACT

A generator assembly including generator means and a first converter member (11), the generator means being arranged to convert mechanical power to electric power and comprising an AC generator (2), a voltage regulator (4) and an AC coupling, the voltage regulator (4) being arranged to regulate magnetization of the AC generator (2) on the basis of data associated with the voltage of the AC coupling of the generator means, the AC coupling being arranged to supply electric power from the AC generator (2) to the first converter member (11), and the first converter member (11) being arranged to rectify the voltage applied through the AC coupling into DC voltage. The first converter member (11) is arranged to adjust the power of the AC generator (2) by changing the component (I q) associated with the torque of the current passing through the AC coupling so as to provide the power of desired magnitude.

5 Claims, 1 Drawing Sheet

GENERATOR ASSEMBLY

BACKGROUND OF THE INVENTION

The invention relates to a generator assembly in accordance with independent claim 1.

A known generator assembly comprises an alternating current generator driven by a variable speed power engine, such as a diesel engine, and electricity generated thereby is supplied to load via a frequency converter. The frequency converter comprises a direct voltage intermediate circuit which is supplied by the AC generator through a diode bridge. Variation in the rotation speed of the AC generator in accordance with the rotation speed of the power engine has a consequence that also the voltage in the direct voltage intermediate circuit of the frequency converter tends to vary. Hence, the generator assembly is provided with a step-up chopper to keep the voltage in the direct voltage intermediate circuit constant. A problem with this generator assembly is that it is relatively complicated to keep the voltage in the direct voltage intermediate circuit constant in the above-described manner.

BRIEF DESCRIPTION OF THE INVENTION

The object of the invention is to provide a generator assembly including an alternating current generator, in which assembly the voltage of a Direct voltage intermediate circuit can be kept substantially constant without a chopper also when the AC generator is driven by a variable speed power engine. The object of the invention is achieved with a generator assembly which is characterized by what is stated in the independent claim. Preferred embodiments of the invention are disclosed in the dependent claims.

The invention is based on the idea that magnetization of the AC generator is adjusted on the basis of its output voltage, and power of the AC generator is adjusted by changing torque-related component of current passing through an AC coupling of the generator.

The generator assembly of the invention has an advantage that direct voltage generated by a first converter member supplied by the AC generator can be kept substantially constant without a chopper.

BRIEF DESCRIPTION OF THE DRAWINGS

In the following, the invention will be described in greater detail in connection with preferred embodiments, with reference to the attached drawings, in which.

DETAILED DESCRIPTION OF THE INVENTION

Figure 1:
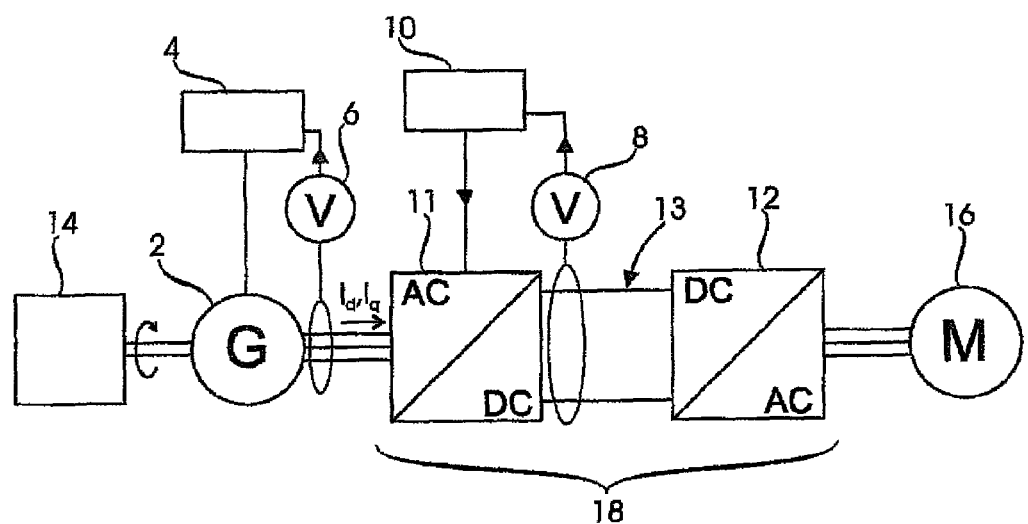
FIG. 1 shows a generator assembly in accordance with an embodiment of the invention.

The generator assembly of FIG. 1 includes a power engine 14, generator means comprising an AC generator 2, a frequency converter 18 and an electric motor 16. The power engine 14 is connected with an axle to the AC generator 2 for mechanical power transmission between the power engine 14 and the AC generator 2. The power engine 14 may be a variable speed power engine, for instance a variable speed diesel engine.

The generator means are arranged to convert the mechanical power from the power engine 14 to AC power. In addition to the AC generator 2, the generator means include an AC coupling, a voltage regulator 4 and AC voltage measuring means 6. The AC coupling of the generator means is arranged to output AC power from the AC generator 2, the voltage regulator 4 is arranged to regulate the voltage of the AC coupling of the generator means and the AC voltage measuring means 6 are arranged to measure the voltage in the AC coupling of the generator means.

The frequency converter 18 includes a first converter member 11, a second converter member 12 and a direct voltage intermediate circuit 13. The first converter member 11 comprises an AC coupling that is connected to the AC coupling of the generator means and a DC coupling that is connected to the direct voltage intermediate circuit 13. The first converter member 11 is arranged to rectify the voltage to be inputted to its AC coupling into DC voltage and to supply this DC voltage through its DC coupling to the direct voltage intermediate circuit 13. The second converter member 12 comprises a DC coupling that is connected to the direct voltage intermediate circuit 13 and an AC coupling that is connected to the electric motor 16. The second converter member 12 is arranged to invert the DC voltage of the direct voltage intermediate circuit 13 into AC voltage and to supply the electric motor 16 with the AC voltage.

The frequency converter 18 also includes DC voltage measuring means 8, which are arranged to measure the voltage of the direct voltage intermediate circuit 13, and a controller 10, which is arranged to control the operation of the first converter member 11. In terms of data transmission, the DC voltage measuring means 8 are connected to the controller 10 for transmitting data associated with the voltage of the direct voltage intermediate circuit 13 to the controller 10. The controller 10 is capable of adjusting a component $I_d$ associated with the magnetization and a component $I_q$ associated with the torque of the current passing through the AC coupling of the first converter member 11.

The controller 10 is arranged to control the power of the AC generator 2 on the basis of data associated with voltage of the direct voltage intermediate circuit 13 and received from the DC voltage measuring means 8. Power control is implemented such that the controller 10 changes the component $I_q$ associated with the torque of the current passing through the AC coupling of the first converter member 11 so as to obtain the desired power from the AC generator 2.

The voltage regulator 4 of the generator means is arranged to regulate the magnetization of the AC generator 2 on the basis of data associated with the voltage of the AC coupling and received from the AC voltage measuring means 6. In an embodiment of the invention the magnetization of the AC generator 2 is provided completely by the voltage regulator 4.

In an alternative embodiment a limited portion of the magnetization of the AC generator 2 is obtained by means of the first converter member 11 by generating a desired amount of magnetization-related component $I_d$ in the current passing through the AC coupling of the generator assembly. The amount of magnetization-related component $I_d$ provided by the first converter member 11 is in that case limited such that the voltage regulator 4 is able to remain within its normal operating range in all use situations. The amount of magnetization-related component $I_d$ provided by the first converter member 11 is controlled with the controller 10.

Generation of the magnetization-related component $I_d$ with the first converter member 11 increases losses of the generator assembly, in addition to which the magnetization-related component $I_d$ must be taken into account in design of the first converter member 11.

The amount of magnetization of the AC generator 2 affects the output voltage of the AC generator 2 and consequently to the voltage in the AC coupling of the generator assembly. In accordance with the above, depending on the embodiment, it is possible to regulate the voltage of the AC coupling of the generator assembly by using the voltage regulator 4 alone or by using both the first converter member 11 and the voltage regulator.

The voltage regulator 4 and the controller 10 of the first converter member 11 operate independently without mutual data exchange. Thus, the voltage regulator 4 tends to regulate the voltage of the AC coupling of the generator assembly in accordance with its target value irrespective of the operation of the first converter member 11.

Figure 2:
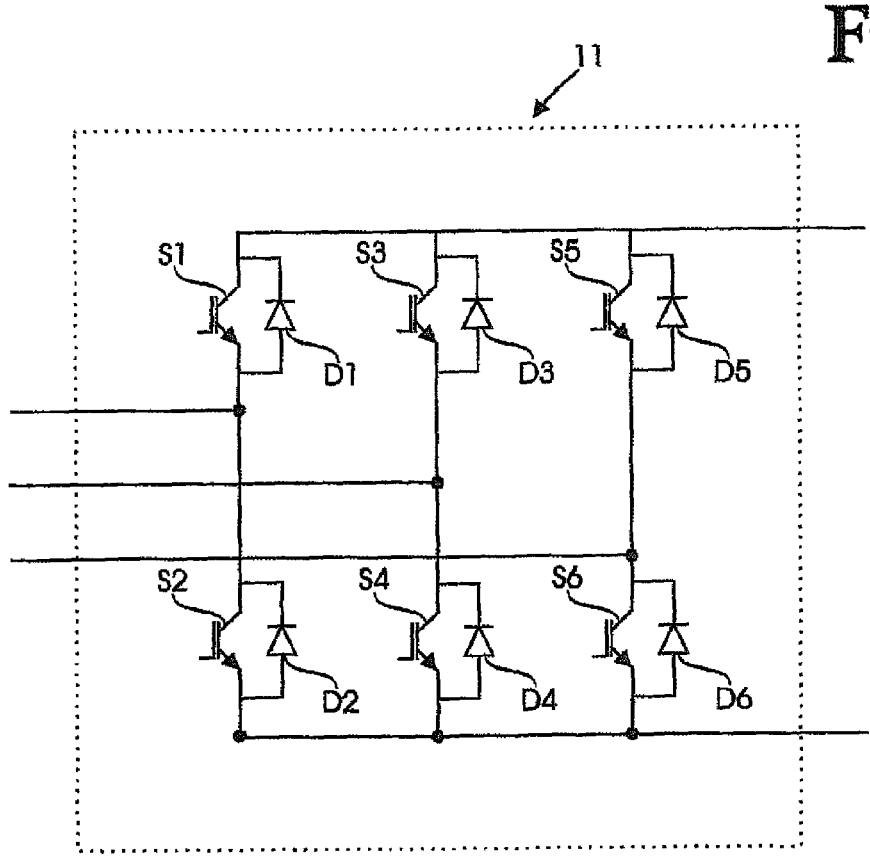
FIG. 2 shows a simplified circuit diagram of a first converter member of the generator assembly.

FIG. 2 shows a simplified circuit diagram of the first converter member 11. It appears from FIG. 2 that the first converter member 11 comprises six insulated-gate bipolar transistors S1 to S6 and six diodes D1 to D6, each of the diodes D1 to D6 being coupled in antiparallel with the corresponding bipolar transistor. The insulated-gate bipolar transistors, i.e. IGB transistors, and bridge connections formed thereby are commonly known in the field, and therefore they are not described in greater detail herein.

The structure of the second converter member 12 may be the same as that of the first converter member 11 shown in FIG. 2. In that case the generator assembly is a four-quadrant electric drive, in which electricity may be supplied both from the AC generator 2 to the electric motor 16 and vice versa. In the four-quadrant electric drive the rotation speed and the direction of the torque of the electric machine may vary freely. The four-quadrant drive may be utilized in crane applications, for instance.

In alternative embodiments the structure of the second converter member may differ from that of the first converter member. Instead of the four-quadrant drive the generator assembly may also be arranged to be a one-quadrant or a two-quadrant drive. In addition, the generator assembly may comprise brake resistor means.

The direct voltage intermediate circuit of the generator assembly may supply more than one electric motor. In addition to various AC motors the electric motors supplied by the generator assembly may also comprise DC motors. Each AC motor may be supplied by the corresponding inverter. Each DC motor may be supplied directly from the direct voltage intermediate circuit or through the corresponding DC converter. Further, the direct voltage intermediate circuit of the generator assembly may be arranged to supply loads of some other type apart from the electric motors.

In an embodiment of the invention the AC generator is a brushless synchronous generator, and the magnetization energy it requires is produced by a permanent-magnet auxiliary generator provided on its axis. AC generators of other types may also be used. In addition, it is possible to connect to the direct voltage intermediate circuit of the generator assembly a plurality of AC generators, each of which may be connected to the direct voltage intermediate circuit by means of a specific rectifier.

It is apparent to a person skilled in the art that the basic idea of the invention may be implemented in a variety of ways. Thus, the invention and its embodiments are not restricted to the above-described examples but they may vary within the scope of the claims.

The invention claimed is:

1. A generator assembly including
    generator means; and
    a first converter member,
    wherein the generator means is arranged to convert mechanical power to electric power and comprises an AC generator, a voltage regulator and an AC coupling, the voltage regulator being arranged to regulate magnetization of the AC generator on the basis of data associated with the voltage of the AC coupling of the generator means, the AC coupling being arranged to supply electric power from the AC generator to the first converter member, and the first converter member being arranged to rectify the voltage applied through the AC coupling into DC voltage,
    wherein the first converter member includes a controller that is arranged to adjust the power of the AC generator by changing a component ($I_q$) associated with the torque of the current passing though the AC coupling so as to obtain power of desired magnitude from the AC generator and is arranged to provide a limited amount of the magnetization-related current component ($I_d$) in the current passing through the AC coupling, the limited amount being limited such that the voltage regulator is able to remain within its normal operating range in all use situations, and
    wherein the voltage regulator of the generator means and the controller of the first converter member operate independently without mutual data exchange.

2. The generator assembly of claim 1, further comprising a direct voltage intermediate circuit which is arranged to receive DC voltage generated by the first converter member, wherein the controller of the first converter member is arranged to adjust the power of the AC generator based on data associated with the DC voltage of the direct voltage intermediate circuit.

3. The generator assembly of claim 2, wherein the first converter member comprises a bridge connection having a plurality of controllable switches (S1-S6).

4. The generator assembly of claim 1, wherein the first converter member comprises a bridge connection having a plurality of controllable switches (S1-S6).

5. A generator assembly including
    generator means; and
    a first converter member,
    wherein the generator means is arranged to convert mechanical power to electric power and comprises an AC generator, a voltage regulator and an AC coupling, the voltage regulator being arranged to regulate magnetization of the AC generator on the basis of data associated with the voltage of the AC coupling of the generator means, the AC coupling being arranged to supply electric power from the AC generator to the first converter member, and the first converter member being arranged to rectify the voltage applied through the AC coupling into DC voltage,
    wherein the AC generator is a synchronous generator, and the first converter member includes a controller that is arranged to adjust the power of the AC generator by changing a component ($I_q$) associated with the torque of the current passing though the AC coupling so as to obtain power of desired magnitude from the AC generator and is arranged to provide a limited amount of the magnetization-related current component ($I_d$) in the current passing through the AC coupling, the limited amount being limited such that the voltage regulator is able to remain within its normal operating range in all use situations, and
    wherein the voltage regulator of the generator means and the controller of the first converter member operate independently without mutual data exchange.

* * * * *